(12) United States Patent
Kondo

(10) Patent No.: US 9,813,955 B2
(45) Date of Patent: Nov. 7, 2017

(54) CELL INFORMATION TRANSMISSION SYSTEM, BASE STATION, CELL INFORMATION TRANSMISSION METHOD, AND CELL INFORMATION TRANSMISSION PROGRAM FOR DIFFERENTIATING CONTENT OF A NEIGHBOR CELL LIST

(71) Applicant: NEC Corporation, Tokyo (JP)

(72) Inventor: Takayuki Kondo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/762,882

(22) PCT Filed: Nov. 26, 2013

(86) PCT No.: PCT/JP2013/081708
§ 371 (c)(1),
(2) Date: Jul. 23, 2015

(87) PCT Pub. No.: WO2014/115418
PCT Pub. Date: Jul. 31, 2014

(65) Prior Publication Data
US 2015/0373594 A1 Dec. 24, 2015

(30) Foreign Application Priority Data
Jan. 23, 2013 (JP) .................................. 2013-010210

(51) Int. Cl.
*H04W 36/00* (2009.01)
*H04W 64/00* (2009.01)

(52) U.S. Cl.
CPC ... *H04W 36/0083* (2013.01); *H04W 36/0061* (2013.01); *H04W 64/006* (2013.01)

(58) Field of Classification Search
CPC .................................................. H04W 36/0083
See application file for complete search history.

(56) References Cited

U.S. PATENT DOCUMENTS 6,311,065 B1 10/2001 Ushiki et al.
7,929,970 B1 4/2011 Gunasekara et al.
(Continued)

FOREIGN PATENT DOCUMENTS

EP 1681889 A1 7/2016
JP 10290475 10/1998
(Continued)

OTHER PUBLICATIONS

3GPP TS 36.331 : Evolved Universal Terrestrial Radio Access (E-UTRA); Radio Resource Control (RRC); Protocol specification, [online], [search on Jan. 12, 2013], Internet; http://www.3gpp.org/ftp/Specs/archive/36_series/36.331/>.
(Continued)

*Primary Examiner* — Idowu O Osifade
(74) *Attorney, Agent, or Firm* — Young & Thompson

(57) ABSTRACT

In a wireless communication system, information about neighbor cells does not necessarily include information about all neighbor cells; instead, the movement history of each mobile station is taken into consideration when information about cells is included. Provided is a base station for performing wireless communication with a mobile station, the base station differentiating, according to the content of the movement history of the mobile station that moved into a cell under control of the base station, the content of a neighbor cell list as used by the mobile station.

15 Claims, 15 Drawing Sheets

(56) References Cited

U.S. PATENT DOCUMENTS

| | | | | |
|---|---|---|---|---|
| 2001/0055969 | A1* | 12/2001 | Bonta | H04W 36/0055 |
| | | | | 455/436 |
| 2006/0084445 | A1 | 4/2006 | Minami et al. | |
| 2007/0275734 | A1* | 11/2007 | Gaal | G01S 19/25 |
| | | | | 455/456.6 |
| 2009/0274086 | A1* | 11/2009 | Petrovic | H04J 11/0093 |
| | | | | 370/312 |
| 2009/0318144 | A1 | 12/2009 | Thomas | |
| 2010/0029298 | A1* | 2/2010 | Iwamura | H04J 11/0069 |
| | | | | 455/456.1 |

FOREIGN PATENT DOCUMENTS

| | | |
|---|---|---|
| JP | 2006-115291 | 4/2006 |
| JP | 2010-239657 | 10/2010 |
| JP | 2012-028982 | 2/2012 |
| JP | 2012-147258 | 8/2012 |
| JP | 2012-165476 | 8/2012 |
| WO | 2011148883 | 12/2011 |

OTHER PUBLICATIONS

International Search Report PCT/JP2013/081708 dated Dec. 24, 2013.
Japanese Official Action—2014-558450—dated Sep. 13, 2016.
Extended European Search Report dated Sep. 6, 2016; Application No. 13872419.0.

* cited by examiner

The IE SystemInformationBlockType3 contains cell re-selection information common for intra-frequency, inter-frequency and/ or inter-RAT cell re-selection (i.e. applicable for more than one type of cell re-selection but not necessarily all) as well as intra-frequency cell re-selection information other than neighbouring cell related.

SystemInformationBlockType3.1 information element
-- ASN1START

```
SystemInformationBlockType3.1 ::=        SEQUENCE {
    cellReselectionInfoCommon    SEQUENCE {
        q-Hyst                   ENUMERATED {
                                 dB0, dB1, dB2, dB3, dB4, dB5, dB6, dB8, dB10,
                                 dB12, dB14, dB16, dB18, dB20, dB22, dB24},
        speedStateReselectionPars         SEQUENCE {
            mobilityStateParameters       MobilityStateParameters,
            q-HystSF             SEQUENCE {
            sf-Medium                ENUMERATED {
                                     dB-6, dB-4, dB-2, dB0},
            sf-High                  ENUMERATED {
                                     dB-6, dB-4, dB-2, dB0}
            }
        }                        OPTIONAL                    -- Need OP
    },
    cellReselectionServingFreqInfo    SEQUENCE {
        s-NonIntraSearch         ReselectionThreshold OPTIONAL,     -- Need OP
        threshServingLow         ReselectionThreshold,
        cellReselectionPriority  CellReselectionPriority
    },
    intraFreqCellReselectionInfo   SEQUENCE {
        q-RxLevMin               Q-RxLevMin,
        p-Max                    P-Max           OPTIONAL,          -- Need OP
        s-IntraSearch            ReselectionThreshold    OPTIONAL,  -- Need OP
        allowedMeasBandwidth     AllowedMeasBandwidth           OPTIONAL,            -- Need OP
        presenceAntennaPort1     PresenceAntennaPort1,
        neighCellConfig          NeighCellConfig,
        t-ReselectionEUTRA       T-Reselection,
        t-ReselectionEUTRA-SF    SpeedStateScaleFactors OPTIONAL    -- Need OP
    },
    ...,
    lateR8NonCriticalExtension        OCTET STRING           OPTIONAL,        -- Need OP
    [[    s-IntraSearch-v920       SEQUENCE {
              s-IntraSearchP-r9       ReselectionThreshold,
              s-IntraSearchQ-r9       ReselectionThresholdQ-r9
          }                                 OPTIONAL,              -- Need OP
          s-NonIntraSearch-v920          SEQUENCE {
              s-NonIntraSearchP-r9       ReselectionThreshold,
              s-NonIntraSearchQ-r9            ReselectionThresholdQ-r9
          }                                 OPTIONAL,              -- Need OP
          q-QualMin-r9           Q-QualMin-r9           OPTIONAL,   -- Need OP
          threshServingLowQ-r9   ReselectionThresholdQ-r9  OPTIONAL   -- Need OP
    ]]
}
```

-- ASN1STOP

FIG.12

```
SystemInformationBlockType3.2 information element
-- ASN1START

SystemInformationBlockType3.2 ::=      SEQUENCE {
    cellReselectionInfoCommon          SEQUENCE {
        q-Hyst                         ENUMERATED {
                                           dB0, dB1, dB2, dB3, dB4, dB5, dB6, dB8, dB10,
                                           dB12, dB14, dB16, dB18, dB20, dB22, dB24},
        speedStateReselectionPars      SEQUENCE {
            mobilityStateParameters            MobilityStateParameters,
            q-HystSF       SEQUENCE {
                sf-Medium                  ENUMERATED {
                                               dB-6, dB-4, dB-2, dB0},
                sf-High                    ENUMERATED {
                                               dB-6, dB-4, dB-2, dB0}
            }
        }                                          OPTIONAL-- Need OP
},
    cellReselectionServingFreqInfo     SEQUENCE {
        s-NonIntraSearch   ReselectionThreshold                OPTIONAL,       -- Need OP
        threshServingLow   ReselectionThreshold,
        cellReselectionPriority    CellReselectionPriority
},
    intraFreqCellReselectionInfo       SEQUENCE {
        q-RxLevMin                 Q-RxLevMin,
        p-Max              P-Max                   OPTIONAL,            -- Need OP
        s-IntraSearch              ReselectionThreshold   OPTIONAL,       -- Need OP
        allowedMeasBandwidth       AllowedMeasBandwidth   OPTIONAL,       -- Need OP
        presenceAntennaPort1       PresenceAntennaPort1,
        neighCellConfig            NeighCellConfig,
        t-ReselectionEUTRA     T-Reselection,
        t-ReselectionEUTRA-SF          SpeedStateScaleFactors          OPTIONAL       --
Need OP
},
...,
lateR8NonCriticalExtension     OCTET STRING                    OPTIONAL,  -- Need OP
[[      s-IntraSearch-v920     SEQUENCE {
            s-IntraSearchP-r9      ReselectionThreshold,
            s-IntraSearchQ-r9      ReselectionThresholdQ-r9
        }                          OPTIONAL,           -- Need OP
        s-NonIntraSearch-v920      SEQUENCE {
            s-NonIntraSearchP-r9       ReselectionThreshold,
            s-NonIntraSearchQ-r9       ReselectionThresholdQ-r9
        }                          OPTIONAL,           -- Need OP
        q-QualMin-r9           Q-QualMin-r9        OPTIONAL,       -- Need OP
        threshServingLowQ-r9       ReselectionThresholdQ-r9    OPTIONAL             -- Need OP
    ]]
}

-- ASN1STOP
```

FIG.13

The IE System Information Block Type4 contains neighbouring cell related information relevant only for intra-frequency cell re-selection. The IE includes cells with specific re-selection parameters as well as blacklisted cells.

-- ASN1START    SystemInformationBlockType4.1 information element

```
SystemInformationBlockType4.1 ::= SEQUENCE {
    intraFreqNeighCellList      IntraFreqNeighCellList      OPTIONAL,   -- Need OR
    intraFreqBlackCellList      IntraFreqBlackCellList      OPTIONAL,   -- Need OR
    csg-PhysCellIdRange         PhysCellIdRange             OPTIONAL,   -- Cond CSG
    ...,
    lateR8NonCriticalExtension  OCTET STRING                OPTIONAL    -- Need OP
}

IntraFreqNeighCellList ::= SEQUENCE (SIZE (1..maxCellIntra)) OF IntraFreqNeighCellInfo IntraFreqNeighCellInfo ::= SEQUENCE {
    physCellId          PhysCellId,
    q-OffsetCell        Q-OffsetRange,
    ...
}

IntraFreqBlackCellList ::= SEQUENCE (SIZE (1..maxCellBlack)) OF PhysCellIdRange
```

-- ASN1STOP

FIG.14

-- ASN1START

SystemInformationBlockType4.2 information element

```
SystemInformationBlockType4.2 ::= SEQUENCE {
    intraFreqNeighCellList      IntraFreqNeighCellList    OPTIONAL,    -- Need OR
    intraFreqBlackCellList      IntraFreqBlackCellList    OPTIONAL,    -- Need OR
    csg-PhysCellIdRange         PhysCellIdRange           OPTIONAL,    -- Cond CSG
    ...,
    lateR8NonCriticalExtension  OCTET STRING              OPTIONAL     -- Need OP
}

IntraFreqNeighCellList ::= SEQUENCE (SIZE (1..maxCellIntra)) OF IntraFreqNeighCellInfo IntraFreqNeighCellInfo ::= SEQUENCE {
    physCellId      PhysCellId,
    q-OffsetCell    Q-OffsetRange,
    ...
}

IntraFreqBlackCellList ::= SEQUENCE (SIZE (1..maxCellBlack)) OF PhysCellIdRange
```

-- ASN1STOP

FIG.15

CELL INFORMATION TRANSMISSION SYSTEM, BASE STATION, CELL INFORMATION TRANSMISSION METHOD, AND CELL INFORMATION TRANSMISSION PROGRAM FOR DIFFERENTIATING CONTENT OF A NEIGHBOR CELL LIST

TECHNICAL FIELD

The present invention relates to a cell information transmission system, a base station, a cell information transmission method, and a cell information transmission program for transmitting cell information.

BACKGROUND ART

A wireless communication network in conformity with a cellular communication system represented by a mobile phone network constitutes a wide service area by distributing dispersively a plurality of base stations (eNB: evolutional Node B). Then, each of these plurality of base stations forms and manages "cell" which is an area where the base station itself and a mobile station (UE: User Equipment) such as a mobile phone can communicate with each other.

Further, a mobile station which communicated with a base station managing a certain cell, due to the mobile station's movement, performs handover which is a process to change a communicating counterparty to another base station managing another cell near this certain cell.

Here, in a general mobile communication system, a mobile station which needs handover receives radio wave respectively transmitted from peripheral base stations on the basis of neighbor cell information (NCL: Neighbor Cell List) which is a list of peripheral base stations. Then, the mobile station detects a base station from which the mobile station can acquire the best reception quality and performs handover to the base station. In this way, the mobile station has only to perform reception quality measurement for cells included in the neighbor cell information, and therefore, it is possible to select a cell efficiently.

Utilization of neighbor cell information in a general technique is explained below using concrete examples.

Referring to FIG. 1, this example includes a mobile station (which is written as "UE" in FIG. 1) 700 and a cell group 800. Further, the cell group 800 includes "Cell #1, Cell #2, Cell #3, Cell #4, Cell #5, Cell #6 and Cell #7". Meanwhile, respective cells in the figure are generated and managed by a base station 900 whose illustration is omitted in the FIG. 1.

This example is explained by focusing on Cell #1 which is a cell where the mobile station 700 is currently located. Here, neighbor cell information which shows cells being adjacent to Cell #1 includes "Cell #2, Cell #3, Cell #4, Cell #5, Cell #6 and Cell #7".

Next, referring to FIG. 2, a sequence when the base station 900 notifies the mobile station 700 of the neighbor cell information is explained.

Firstly, the base station 900 which forms and manages Cell #1 transmits notice information to the mobile station 700 (Step S91). The notice information is used for measuring a situation regarding wireless communication of cells near a cell where the mobile station 700 itself is currently located when the mobile station 700 performs connection or reconnection to any cell or handover (HO: Handover) to another cell.

Firstly, in Step S91, the neighbor cell information "Cell #2, Cell #3, Cell #4, Cell #5, Cell #6 and Cell #7" which is information representing cells adjacent to Cell #1 is transmitted as the notice information.

Next, the mobile station 700 which has received the neighbor cell information performs neighbor cell search of Cells in the neighbor cell information (Step S92). Namely, the mobile station 700 measures the situation regarding wireless communication for the neighbor cells, Cell #2, Cell #3, Cell #4, Cell #5, Cell #6 and Cell #7. Further, on the basis of the measuring result, the mobile station 700 performs continuation of connection to Cell #1, handover to another cell and so forth.

Next, as another utilization example of the neighbor cell information, referring to FIG. 3, explained is a sequence at the time of executing handover which is performed by setting handover parameters from the base station 900. The sequence in FIG. 3 is handover control from a system side.

The base station 900 lets the mobile station 700 perform Measurement Configuration of the neighbor cells adjacent to Cell #1. This is, for example, for handover.

Firstly, for performing Measurement Configuration of the neighbor cells of Cell #1, MeasurementConfiguration Message is transmitted from the base station 900 to the mobile station 700 by use of RRCConnectionReconfiguration Message (Step S93).

In a case where the mobile station 700 normally accepts the RRCConnectionReconfiguration Message, the mobile station 700 transmits RRCConnectionReconfiguration Complete to the base station (Step S94). Further, in addition, the mobile station 700 begins measurement of peripheral cells of the mobile station 700. This measurement is performed on the basis of the neighbor cell information of Cell #1 included in MeasurementConfiguration Message. Namely, the measurement is performed for the neighbor cells, Cell #2, Cell #3, Cell #4, Cell #5, Cell #6 and Cell #7.

The mobile station 700 detects and measures neighbor cells existing within a condition of RRCConnectionReconfiguration and then transmits Measurement Report to the base station 900 specifying PCI (Physical Cell Identity) (Step S95). On the basis of MR (Measurement Report), the base station 900 performs handover to, for example, a cell whose reception level is large (Step S96).

Further, concrete examples of communication systems utilizing such neighbor cell information is disclosed in PTL 1 and PTL 2.

PTL1 discloses to differentiate a content of neighbor cell information according to a communication system to which a terminal conforms. This enables to prevent search of cells to which each terminal does not conform.

Also, PTL2 discloses to perform handover on the basis of neighbor cell information and to adjust handover parameters for preventing handover failure.

CITATION LIST

Patent Literature

{PTL 1} Japanese Patent Application Publication No. 2012-165476
{PTL 2} Japanese Patent Application Publication No. 2012-147258

Non-Patent Literature

{NPL 1} 3GPP TS 36.331: Evolved Universal Terrestrial Radio Access (E-UTRA); Radio Resource Control (RRC); Protocol specification, [online], [search on Jan. 12, 2013], Internet & lt; http://www.3gpp.org/ftp/Specs/archive/36_series/36.331/>

SUMMARY OF INVENTION

Technical Problem

As noted above, by use of the neighbor cell information, the mobile station has only to perform reception quality measurement for cells included in the neighbor cell information, and therefore, it is possible to select a cell efficiently.

However, in arts explained by referring to these FIGS. 1 to 3 and arts disclosed in respective cited references, the neighbor cell information is determined per a cell where the mobile station is located. For example, the cell where the mobile station is located is "Cell #1", the neighbor cell information is determined as including "Cell #2, Cell #3, Cell #4, Cell #5, Cell #6 and Cell #7" and the same neighbor cell information is notified to any mobile terminal which is located within the cell. Namely, the arts are not those which notifies of neighbor cells on the basis of the most recent movement history of respective mobile stations.

Then, the aim of the present invention is to provide a cell information transmission system, a base station, a cell information transmission method and a cell information transmission program which enable the neighbor cell information not to include information of all neighbor cells necessarily but to include cell information taking movement history of each mobile station into consideration.

Solution to Problem

According to a first aspect of the present invention, there is provided a base station for executing wireless communication with a mobile station, wherein according to a content of movement history of the mobile station that has moved into a cell under control of the base station, the base station differentiates a content of a neighbor cell list used by the mobile station.

According to a second aspect of the present invention, there is provided a mobile station which receives the plurality of pairs from the base station according to the above first aspect of the present invention, and retrieves a neighbor cell list corresponding to an actual movement history of the mobile station itself from the received plurality of pairs and uses the neighbor cell list.

According to a third aspect of the present invention, there is provided a cell information transmission system including a base station and a mobile station, comprising a neighbor cell information storage which stores a plurality of pairs, each of the pairs including a combination of cells which, until the mobile station moves into a cell under control of the base station, the mobile station is supposed to move through, and a neighbor cell list corresponding to the combination; and a retriever which retrieves a neighbor cell list corresponding to an actual movement history of the mobile station from the plurality of pairs stored in the neighbor cell information storage, wherein the mobile station uses the retrieved neighbor cell list.

According to a fourth aspect of the present invention, there is provided a cell information transmission program for causing a computer to function as a base station executing wireless communication with a mobile station, the program causing the computer to function as: a base station which, according to a content of movement history of the mobile station moving into a cell under control of the base station, differentiates a content of a neighbor cell list transmitted to the mobile station.

According to a fifth aspect of the present invention, there is provided a cell information transmission method performed by a system including a base station and a mobile station, comprising: the base station storing a plurality of pairs into a neighbor cell information storage, each of the pairs including a combination of cells which, until the mobile station moves into a cell under control of the base station, the mobile station is supposed to move through, and a neighbor cell list corresponding to the combination; the base station or the mobile station retrieving a neighbor cell list corresponding to an actual movement history of the mobile station from the plurality of pairs stored in the neighbor cell information storage; and the mobile station using the retrieved neighbor cell list.

Advantageous Effects of the Invention

According to the present invention, it becomes possible not to include information of all neighbor cells necessarily but to include cell information taking movement history of each mobile station into consideration.

BRIEF DESCRIPTION OF DRAWINGS

FIG. 12 A diagram shows SystemInformationBlockType 3.1 in an embodiment of the present invention.

FIG. 13 A diagram shows SystemInformationBlockType 3.2 in an embodiment of the present invention.

FIG. 14 A diagram shows SystemInformationBlockType 4.1 in an embodiment of the present invention.

FIG. 15 A diagram shows SystemInformationBlockType 4.2 in an embodiment of the present invention.

REFERENCE SIGNS LIST

Figure 1:
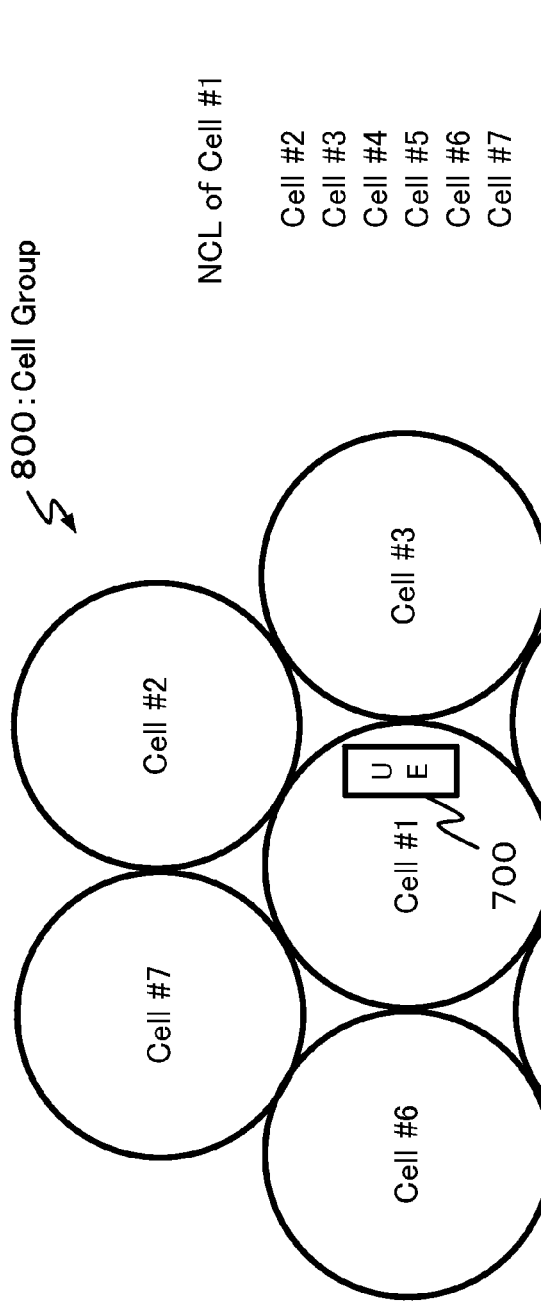
FIG. 1 A conceptual diagram illustrates an arrangement of cells for explaining background of the present invention.
Figure 2:
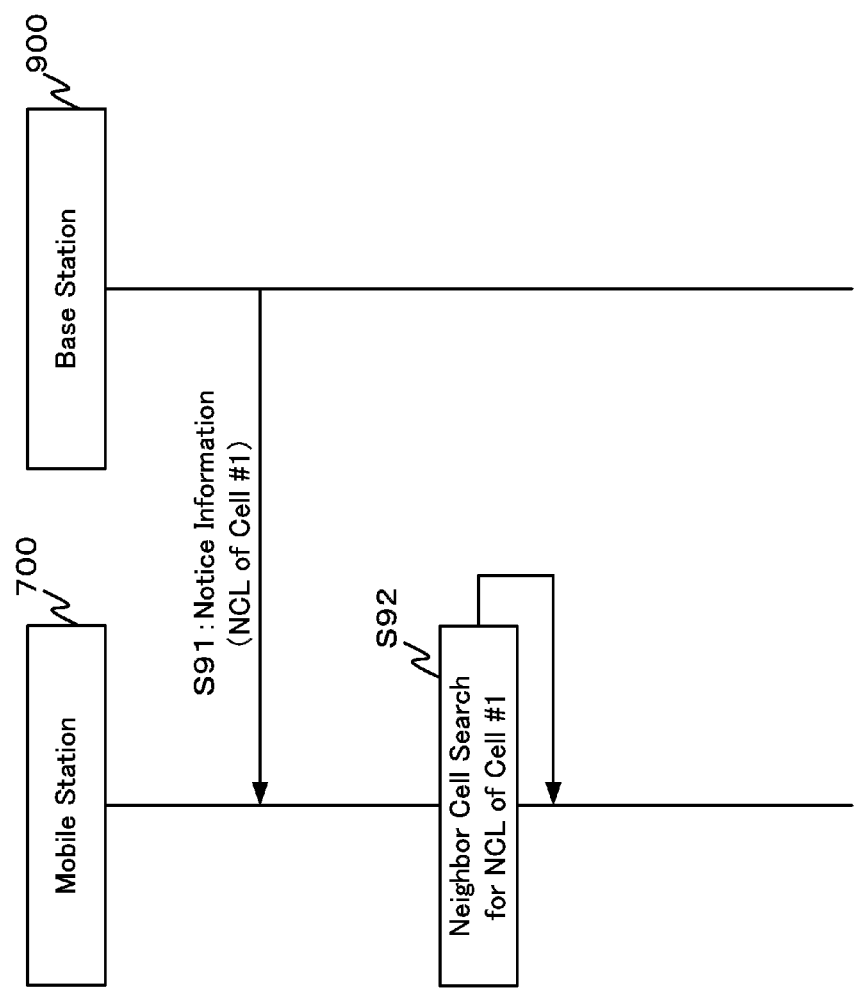
FIG. 2 A sequence diagram illustrates notification of notice information in background of the present invention.
Figure 3:
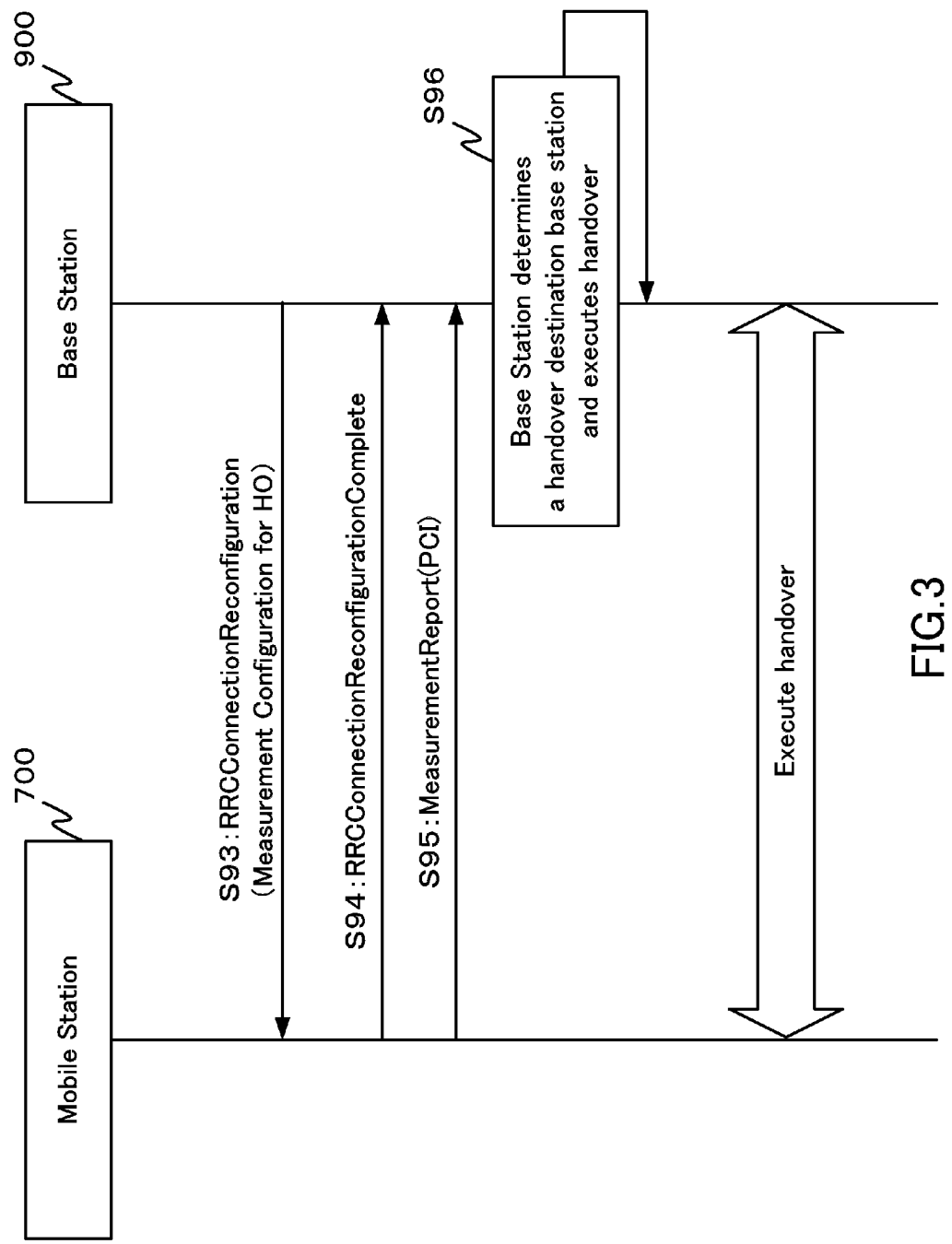
FIG. 3 A sequence diagram shows notification of handover parameters in background of the present invention.

10, 700: Mobile station
11: Mobile station transceiver
12: Mobile station controller
13: Movement history acquirer
14: Movement history storage 20, 900: Base station
21: Base station transceiver
22: Base station controller
23: Neighbor cell information storage
30: Cell
31, 800: Cell group
41, 42: Movement path

DESCRIPTION OF EMBODIMENTS

Next, an embodiment of the present invention is explained in detail referring to figures. Here, in brief, the embodiment is a neighbor cell information transmission method in a mobile communication system, the method being those which transmit neighbor cell information (NCL; Neighbor Cell List) to a mobile station on the basis of the most recent movement history of the mobile station's location.

Figure 4:
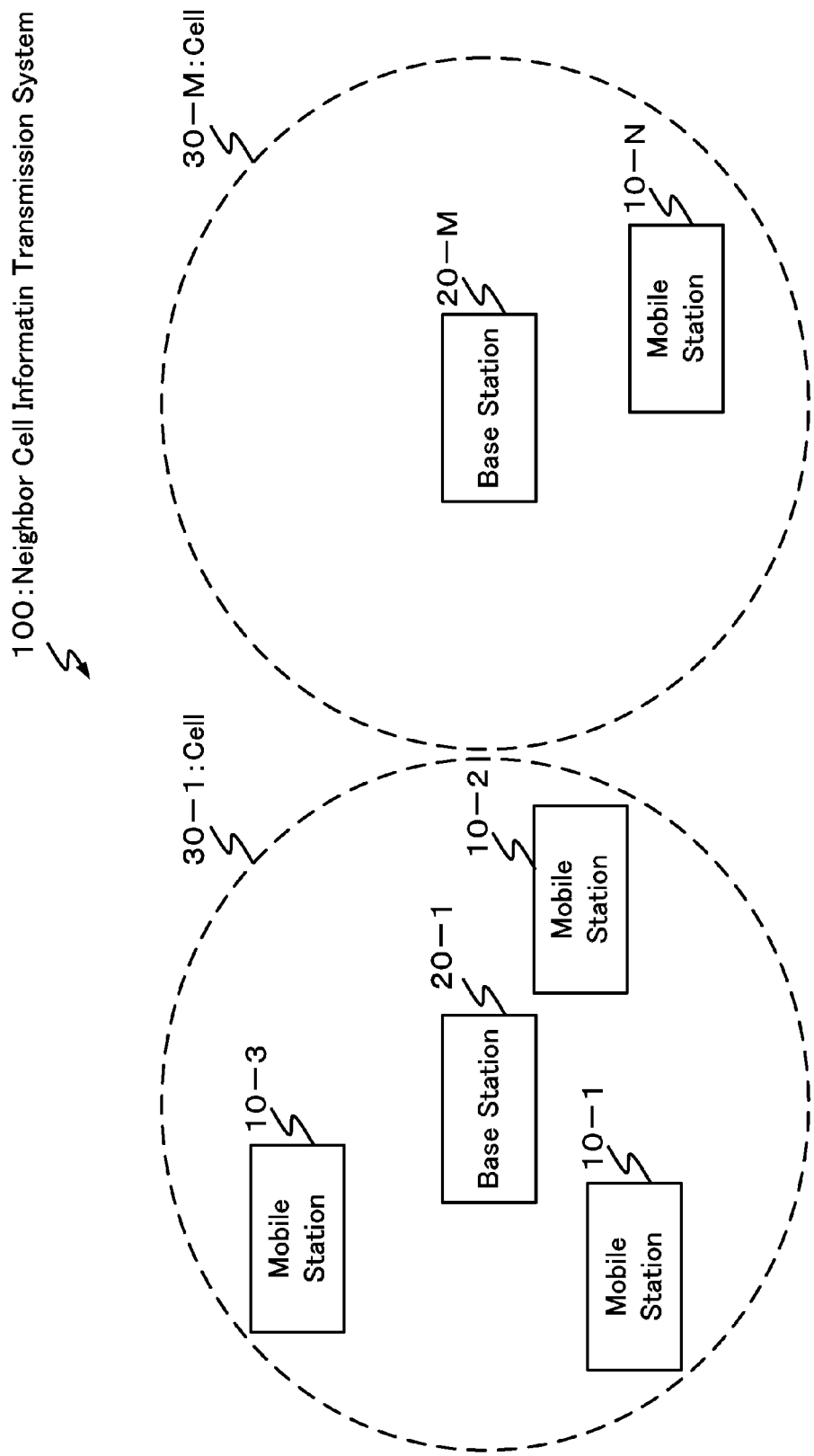
FIG. 4 A block diagram illustrates whole of an embodiment of the present invention.

Referring to FIG. 4, illustrated is a neighbor cell information transmission system 100 which is the embodiment. Here, the neighbor cell information transmission system 100 includes at least one or more mobile stations 10 and a plurality of base stations 20. Further, base stations 20 respectively form cells 30.

Then, each of base stations 20 performs wireless communication with the mobile stations 10 located in an area of cell 30 which the each of base stations 20 forms by itself. Here, in this embodiment, it is supposed that wireless communication in conformity with LTE (Long Term Evolution) is performed, the LTE being a standard which a standardization body 3GPP ($3^{rd}$ Generation Partnership Project) regulates. However, wireless communication system to which the embodiment should conform is not limited, and it is possible to conform to any wireless communication system within a scope being not deviated from the gist of the present invention.

Further, respective base stations 20 are connected to host devices (whose illustration is omitted). Furthermore, respective base stations 20 may be directly connected to each other.

Meanwhile, in order to depict, in FIG. 4, N mobile stations 10 and M base stations 20 are illustrated. However, in this embodiment, the number of mobile stations 10 and the number of base stations 20 are not particularly limited.

Also, according to conforming wireless communication system, part or all of respective base stations 20 can manage two or more cells 30. However, in an explanation of the embodiment, it is supposed that each of base stations 20 has only one cell 30 under control for simplifying the explanation.

Additionally, sizes of the cells 30 are not limited to uniform and there are cases where the sizes differ from each other according to installation environment and so forth. Further, there are cases where different size cells 30 are installed on purpose and those cells are clearly distinguished from each other by use of name such as macro-cell or pico-cell. However, in this embodiment, it is supposed that respective cells 30 have about uniform size for simplifying the explanation. Meanwhile, these suppositions are merely for simplifying the explanation and does not have a gist that it cannot be accepted that the number of cells 30 under control of the base station 20 in this embodiment is limited to only one or different size cells 30 are mixed.

Figure 5:
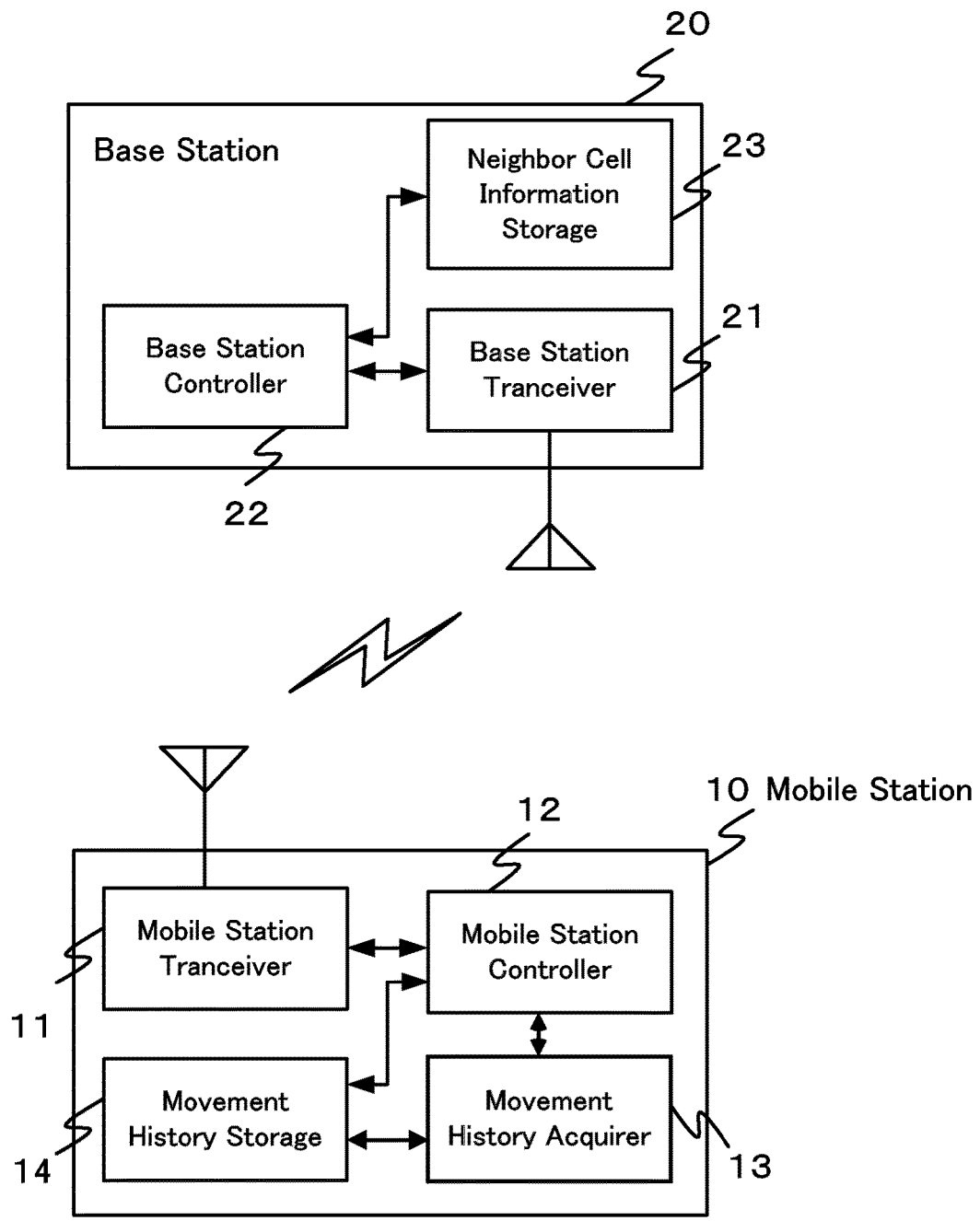
FIG. 5 A block diagram illustrates a base station and a mobile station in an embodiment of the present invention.

Next, referring to FIG. 5, functional blocks included in the mobile station 10 and the base station 20 are explained. Meanwhile, in FIG. 5, among functional blocks included in the mobile station 10 and the base station 20, only components which relate to this embodiment are shown in particular. Namely, the mobile station 10 includes functional blocks for making the mobile station 10 function as a mobile station, although those blocks are not illustrated. Similarly, the base station 20 includes functional blocks for making the base station 20 function as a base station, although those blocks are not illustrated.

Here, the mobile station includes a mobile station transceiver 11, a mobile station controller 12, a movement history acquirer 13 and a movement history storage 14. Further, the base station 20 includes a base station transceiver 21, a base station controller 22 and a neighbor cell information storage 23.

The mobile station 10 is UE (User Equipment) and is a terminal which performs wireless communication with a higher network via the base station 20. Specifically, the mobile station 10 is implemented by, for example, a mobile phone, a portable personal computer and a tablet personal computer which execute data communication by use of a mobile phone network.

The mobile station transceiver 11 includes a function for performing wireless communication with the base station 20. Further, the mobile station transceiver 11 includes a function for measuring wireless quality information between the mobile station and respective base stations 20 for an opportunity of executing handover. Exemplified as general examples of measured objects is wireless quality of respective cells 30, for example, receiving electric power of downstream pilot signal and/or reference signal, or signal to noise interference ratio such as SINR (Signal to Interference plus Noise Ratio). Further, when executing wireless communication in conformity with LTE, exemplified as examples of wireless quality information are RSRP (Reference Signal Received Power) or RSRQ (Reference Signal Received Quality). Meanwhile, these concrete examples of wireless quality information are merely exemplifications, and something other than these exemplifications may be used alternatively as wireless quality information. Further, it is also possible to determine existence of execution of handover on the basis of another standard.

The mobile station controller 12 is a portion which executes a below noted sequence which is peculiar to this embodiment by use of the mobile station transceiver 11 and the movement history storage 14. Further, the mobile station controller 12 may include only a function for implementing this embodiment. Furthermore, the mobile station controller 12 may include a function for controlling whole of the mobile station 10 additionally.

The movement history acquirer 13 is a portion which acquires a history (hereinafter referred to as "cell movement pattern" properly) of cells 30 through which the mobile station 10 itself including this movement history acquirer 13 has moved in the past. Further, the movement history acquirer 13 stores the acquired cell movement pattern into the movement history storage 14. It is not limited how much the cell movement pattern is retraced and stored. However, in this embodiment, at least most recent (for example, three to five cells) mobile station movement history is stored as the cell movement pattern. Further, regarding the cell movement pattern acquisition method, it can be considered that the cell movement pattern is acquired on the basis of communication history which is actually executed in the past between the mobile station and the base station managing each of cells. Further, it can be considered that, although the mobile station moves through a certain cell, the mobile station does not communicate with the certain cell, especially because of a case where the mobile station moves fast, a radio wave state is not satisfactory, the number of mobile terminals which are connected to the base station is limited, and so forth. In this case, the cell movement pattern does not include this certain cell. Then, for dealing with this case, the movement history acquirer 13 may include some positioning function such as a positioning function in conformity with, for example, GPS (Global Positioning System) standard and correct the cell movement pattern on the basis of location information measured by this positioning function. Further, it is also possible that the location information is transmitted to the base station 20 and the base station 20 corrects the cell movement pattern.

The movement history storage 14 is a storage device which stores the cell movement pattern of cells where the mobile station 10 itself including this movement history storage 14 has moved in the past.

The base station 20 is an eNB (evolutional Node B) and forms and manages cells 30 under the base station 20 itself.

The base station transceiver 21 include a function for executing wireless communication with the mobile station 10.

The base station controller 22 is a portion which executes a below noted sequence which is particular to this embodiment by use of information stored in the base station controller 22 and the neighbor cell information storage 23 and thereby notifies the mobile station 10 of the neighbor cell information. Further, the base station controller 22 may include only a function for implementing this embodiment, while the base station controller 22 may include a function for controlling whole of the bases station 20 additionally.

The neighbor cell information storage 23 subdivides cell movement patterns of the mobile station 10 and stores neighbor cell information per each of subdivided cell movement patterns. Here, information stored in the neighbor cell information storage 23 and processes which are performed by the base station controller 22 using this information are explained by referring to FIGS. 6 and 7.

Figure 6:
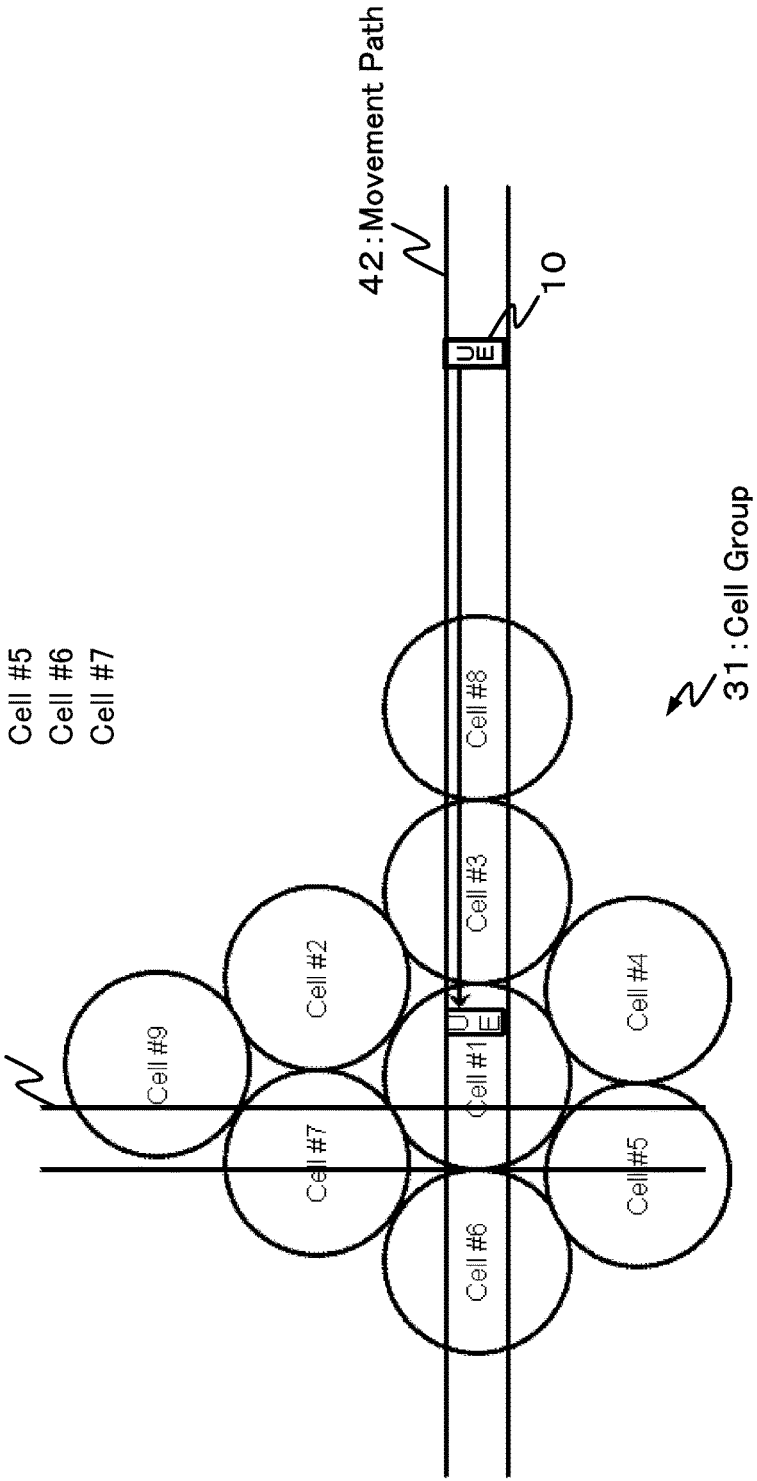
FIG. 6 A conceptual diagram illustrates a concrete example of movement paths of a mobile station in an embodiment of the present invention.
Figure 7:
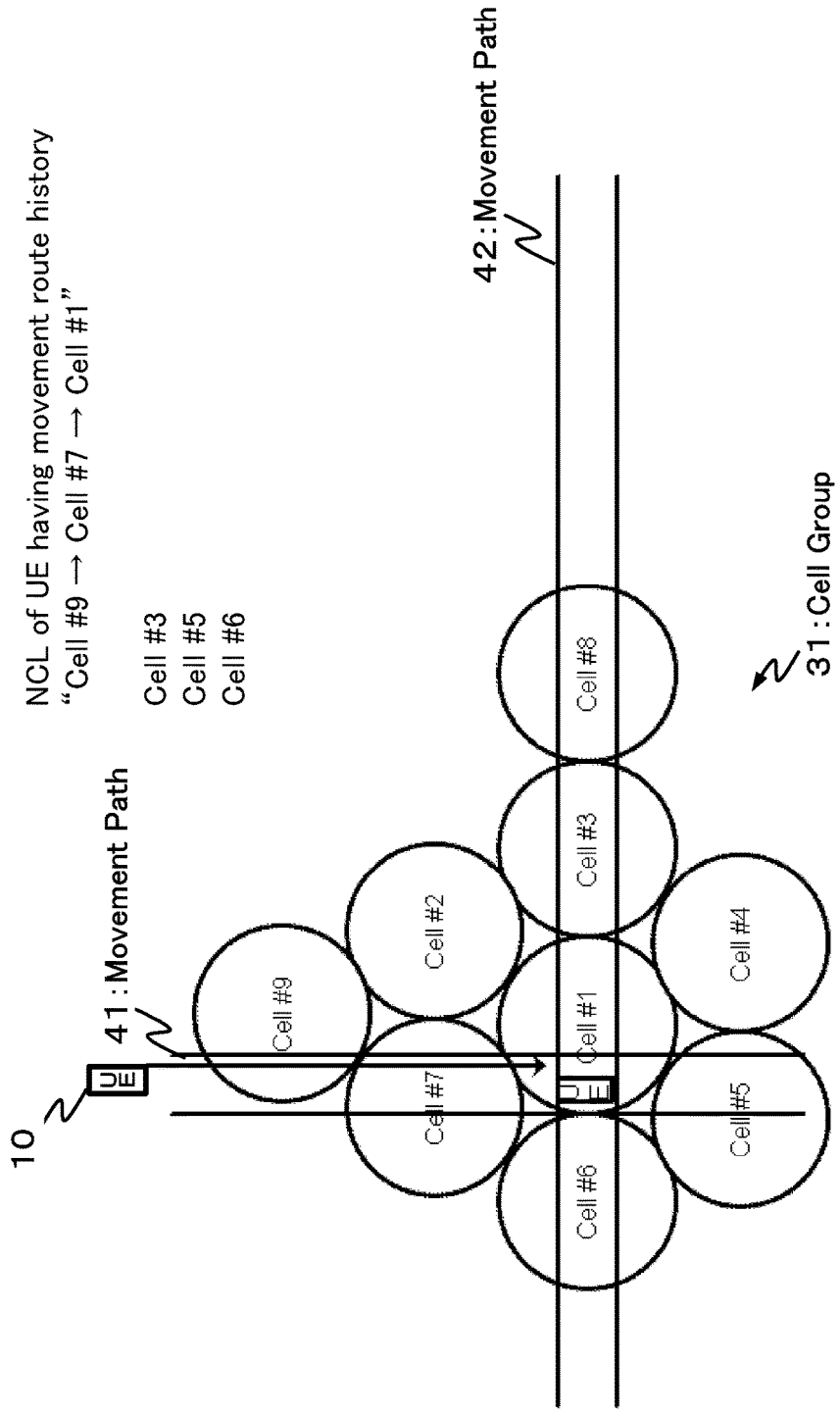
FIG. 7 A conceptual diagram illustrates a concrete example of movement paths of a mobile station in an embodiment of the present invention.

In both of FIG. 6 and FIG. 7, there exist Cell #1 to Cell #9 as cells 30 included in the cell group 31. Further, there exist a movement path 41 and a movement path 42 as movement paths which a user using the mobile station 10 (written as "UE" in the figures) utilizes. The movement path 41 and the movement path 42 are, for example, a road where automobiles run or a railroad where trains run. Further, it is supposed that movement on the movement path 41 and the movement path 42 is usually movement from one side to another side and there is no case where the automobiles or trains turn back on the movement paths.

Here, the explanation is done by focusing on Cell #1. Namely, a point of time when the mobile station 10 arrives at Cell #1 is focused on. Then, the base station 20 forming and managing Cell #1 notifies the mobiles station of neighbor cell information according to a cell movement pattern of the mobile station 10.

For example, in an example of FIG. 6, it is supposed that the mobile station 10 moves on the movement path 42 from right side to left side of the figure. In this case, the cell movement pattern of the mobile station 10 is represented as "Cell #8→Cell #3→Cell #1". At this time, if general techniques are applied, the base station 20 forming and managing Cell #1 notifies the mobile station 10 of information of all cells adjacent to Cell #1 as the neighbor cell information. Namely, as the neighbor cell information, "Cell #2, Cell #3, Cell #4, Cell #5, Cell #6, Cell #7" is notified. Then, on the basis of this neighbor cell information, the mobile station 10 receives the neighbor cell information performs neighbor cell search (measurement of wireless quality information and so forth for each of neighbor cells) for all of "Cell #2, Cell #3, Cell #4, Cell #5, Cell #6, Cell #7". However, from this, the mobile station 10 needs to perform the neighbor cell search even for a cell to which the mobile station 10 has small possibility to move. Then, in this embodiment, not information of all cells adjacent to Cell #1 but information of part of those cells, to which the mobile station 10 has high possibility to move is notified to the mobile station 10 as the neighbor cell information.

This point is explained below. It can be considered that there is small possibility that, for example, the mobile station 10 having moved from Cell #3 to Cell #1 moves to Cell #3 again. This is because, as noted above, movement on the movement path 41 and the movement path 42 is usually movement from one side to another side and there is no case where the mobile station turns back on the movement path. Therefore, cell information of Cell #3 is excluded from the neighbor cell information. On the other hand, if the mobile station 10 keeps moving on the movement path 42, the mobile station 10 will move to Cell #6. Then, cell information of Cell #6 is included in the neighbor cell information.

Further, there is no movement path for moving from Cell #1 to Cell #2 or Cell #4. Therefore, cell information of Cell #2 and Cell #4 is excluded from the neighbor cell information. On the other hand, there is a possibility that the mobile station 10 moves by utilizing the movement path 41 at a point where the movement path 42 and the movement path 41 cross. Then, cell information of Cell #7 and Cell #5 is included in the neighbor cell information.

On the basis of this consideration, to the mobile station 10 which has a cell movement pattern of "Cell #8→Cell #3→Cell #1", a neighbor cell information (Cell #5, Cell #6, Cell #7) is notified. The mobile station 10 which has received the notification executes a neighbor cell search on the basis of the neighbor cell information (Cell #5, Cell #6, Cell #7) as the neighbor cell search. Namely, the neighbor cell search for Cell #5, Cell #6 and Cell #7 is executed.

Next, we explain by referring to an example of FIG. 7. In the example of FIG. 7, it is supposed that the mobile station 10 moves on the movement path 41 from upper side to lower side of the figure. In this case, the cell movement pattern of the mobile station 10 can be represented as "Cell #9→Cell #7→Cell #1".

At this time, if general techniques are applied, as noted above, "Cell #2, Cell #3, Cell #4, Cell #5, Cell #6, Cell #7" is notified to the mobile station 10 as the neighbor cell information. However, in this embodiment, based on below noted consideration, not information of all cells adjacent to Cell #1 but information of part of those cells is notified to the mobile station 10 as the neighbor cell information. Namely, it is possible to reduce the number of cells included in the neighbor cell information. Meanwhile, there is a case where the number of neighbor cells is small, such as two. In this case, information of all cells adjacent to a certain cell is included in the neighbor cell information transmitted. However, there are merely a few cases corresponding to this case, and, even if this case corresponds to part of cells, it is possible to reduce the number of cells included in the neighbor cell information as whole of system.

Firstly, there is low possibility that the mobile station 10 having moved to Cell #1 will move to Cell #7 next. This is because, as noted above, movement on the movement path 41 and the movement path 42 is usually movement from one side to another side and there is no case where the mobile station turns back on the movement path. Therefore, cell information of Cell #7 is excluded from the neighbor cell information. On the other hand, if the mobile station 10 keeps moving on the movement path 41, the mobile station 10 will move to Cell #5. Then, cell information of Cell #5 is included in the neighbor cell information.

Further, there is no movement path for moving from Cell #1 to Cell #2 or Cell #4. Therefore, cell information of Cell #2 and Cell #4 is excluded from the neighbor cell information. On the other hand, there is a possibility that the mobile station 10 moves by utilizing the movement path 42 at the point where the movement path 42 and the movement path 41 cross. Then, cell information of Cell #3 and Cell #6 is included in the neighbor cell information.

On the basis of this consideration, to the mobile station 10 which has a cell movement pattern of "Cell #9→Cell #7→Cell #1", a neighbor cell information (Cell #3, Cell #5, Cell #6) is notified. The mobile station 10 which has received the notification executes neighbor cell search on the basis of the neighbor cell information (Cell #3, Cell #5, Cell #6) as the neighbor cell search. Namely, the neighbor cell search for Cell #3, Cell #5 and Cell #6 is executed.

From the above, in a general system (see FIG. 1 and so forth), (Cell #2, Cell #3, Cell #4, Cell #5, Cell #6, Cell #7) is treated as the neighbor cell information, while, in this embodiment, it is possible to reduce notified neighbor cell candidates on the basis of the cell movement pattern in any case of FIG. 6 and FIG. 7. Accordingly, it becomes possible to reduce the number of objects for which the mobile station 10 executes the neighbor cell search, find a handover destination more quickly, and moderate electric power consumption at the mobile station 10. Meanwhile, it can be considered that the neighbor cell information corresponding to the cell movement pattern is stored in the neighbor cell information storage 23 when installing the base station 20. Further, it can be considered to correct the neighbor cell information in the neighbor cell information storage 23 when environmental change (for example, new installation of another base station 20 or change of a movement path) occurs. Furthermore, although a specific method is noted below, it is also possible that the base station 20 generates and corrects the neighbor cell information spontaneously.

Figure 8:
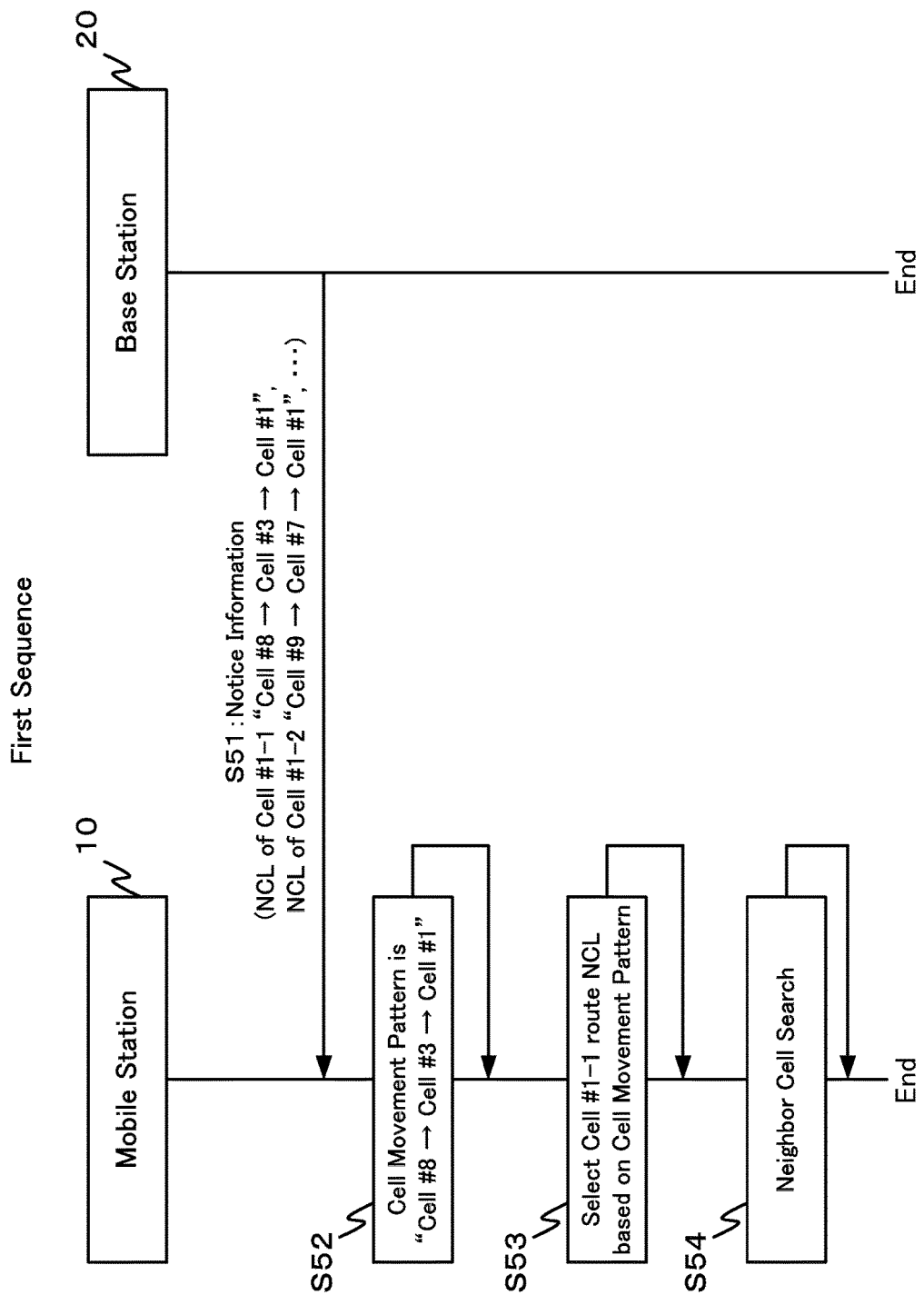
FIG. 8 A sequence diagram shows a first sequence in an embodiment of the present invention.
Figure 9:
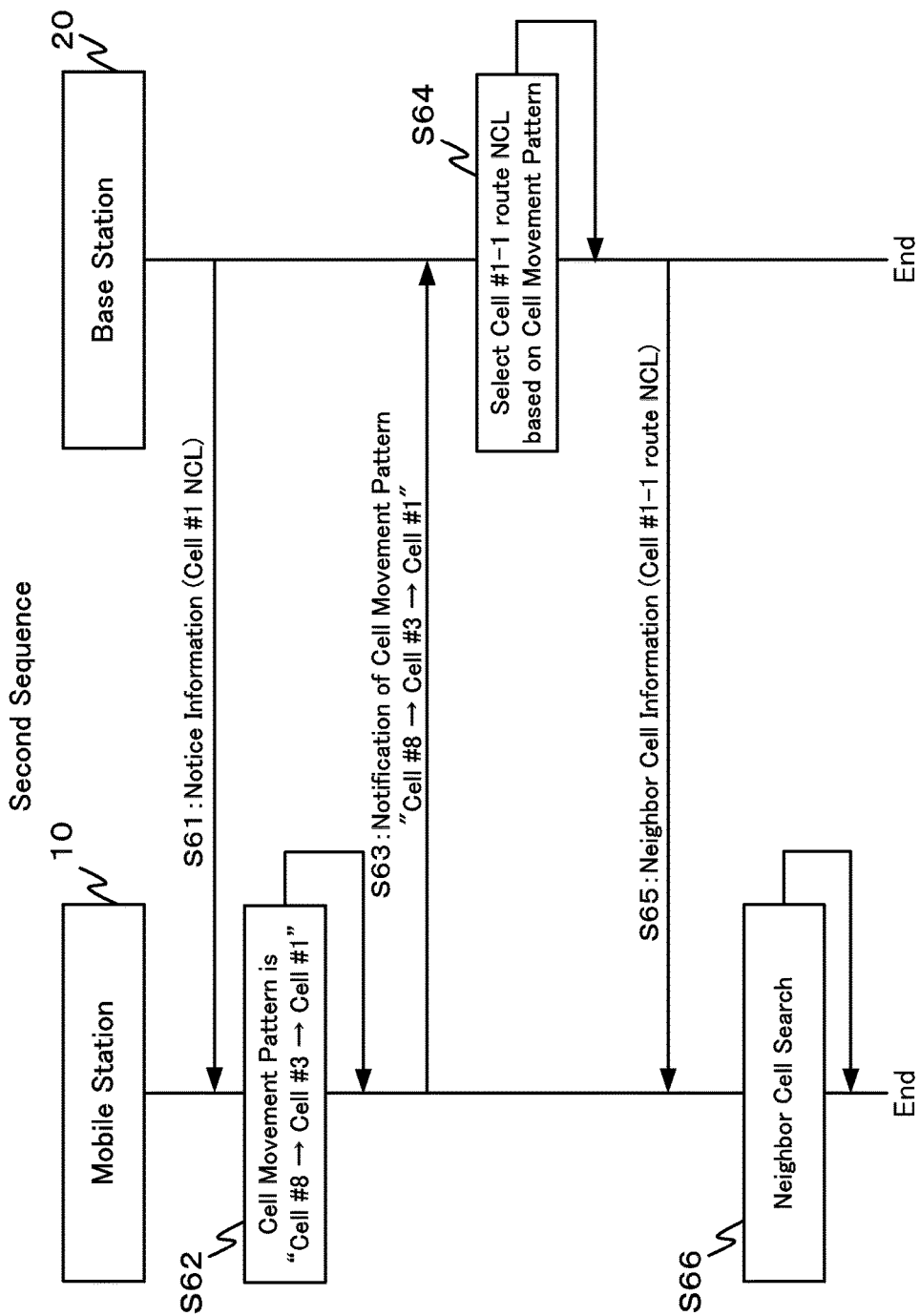
FIG. 9 A sequence diagram shows a second sequence in an embodiment of the present invention.

Next, operations of this embodiment are explained by referring to sequence diagrams of FIGS. 8 to 9.

Firstly, a first sequence of this embodiment is explained by referring to FIG. 8. It is supposed that the sequence in FIG. 8 is performed under the same situation as the situation illustrated in FIG. 6.

In the first sequence, the base station 20 does not grasp the cell movement pattern of the mobile station 10. Then, the base station 20 notifies the mobile station 10 of all of the neighbor cell information as notice information, the neighbor cell information being stored in the neighbor cell information storage 23 (Step S51). Notified as notice information are all of the neighbor cell information such as neighbor cell information corresponding to the mobile station 10 having a cell movement pattern of "Cell #8→Cell #3→Cell #1" (hereinafter referred to as "Cell #1-1 route NCL"), neighbor cell information corresponding to the mobile station 10 having a cell movement pattern of "Cell #9→Cell #7→Cell #1" (hereinafter referred to as "Cell #1-2 route NCL") . . . .

The mobile station 10 which has received the notification refers to the movement history storage 14 and confirms a current cell movement pattern. As a result of the confirmation, the mobile station 10 knows that the current cell movement pattern is "Cell #8→Cell #3→Cell #1" (Step S52).

Next, the mobile station 10 compares the current cell movement pattern and the notice information which is notified from the base station 20 and selects neighbor cell information corresponding to the current cell movement pattern "Cell #8→Cell #3→Cell #1". In this example, "Cell #1-1 route NCL" is selected (Step S53).

Then, neighbor cell search is executed by use of the selected neighbor cell information (Step S54). Namely, executed is neighbor cell search on the basis of neighbor cell information (Cell #5, Cell #6, Cell #7) corresponding to a cell movement pattern "Cell #8→Cell #3→Cell #1". Namely, the neighbor cell search for Cell #5, Cell #6 and Cell #7 is executed.

Next, a second sequence is explained by referring to FIG. 9. This sequence is acquired by improving above noted first sequence.

Referring to FIG. 9, the base station managing Cell #1 notifies the mobile station 10 in Cell #1 of the neighbor cell information "Cell #2, Cell #3, Cell #4, Cell #5, Cell #6, Cell #7" as notice information of Cell #1 (Cell #1 NCL) (Step S61).

The mobile station 10 which has received the notification notifies the base station 20 of a cell movement pattern without executing neighbor cell search on the basis of neighbor cell information "Cell #2, Cell #3, Cell #4, Cell #5, Cell #6, Cell #7" (Step S62, Step S63). Meanwhile, a current cell movement pattern is "Cell #8→Cell #3→Cell #1".

The base station 20 selects neighbor cell information of the route corresponding to this current cell movement pattern (Step S64). In this example, this is Cell #1-1 route NCL. Then, to the mobile station 10, the base station transmits Cell #1-1 route NCL which is neighbor cell information subdivided per selected route (Step S65). The mobile station executes neighbor cell search of Cell included in Cell #1-1 route NCL. Namely, neighbor cell search for Cell #5, Cell #6 and Cell #7 is executed (Step S66).

Figure 10:
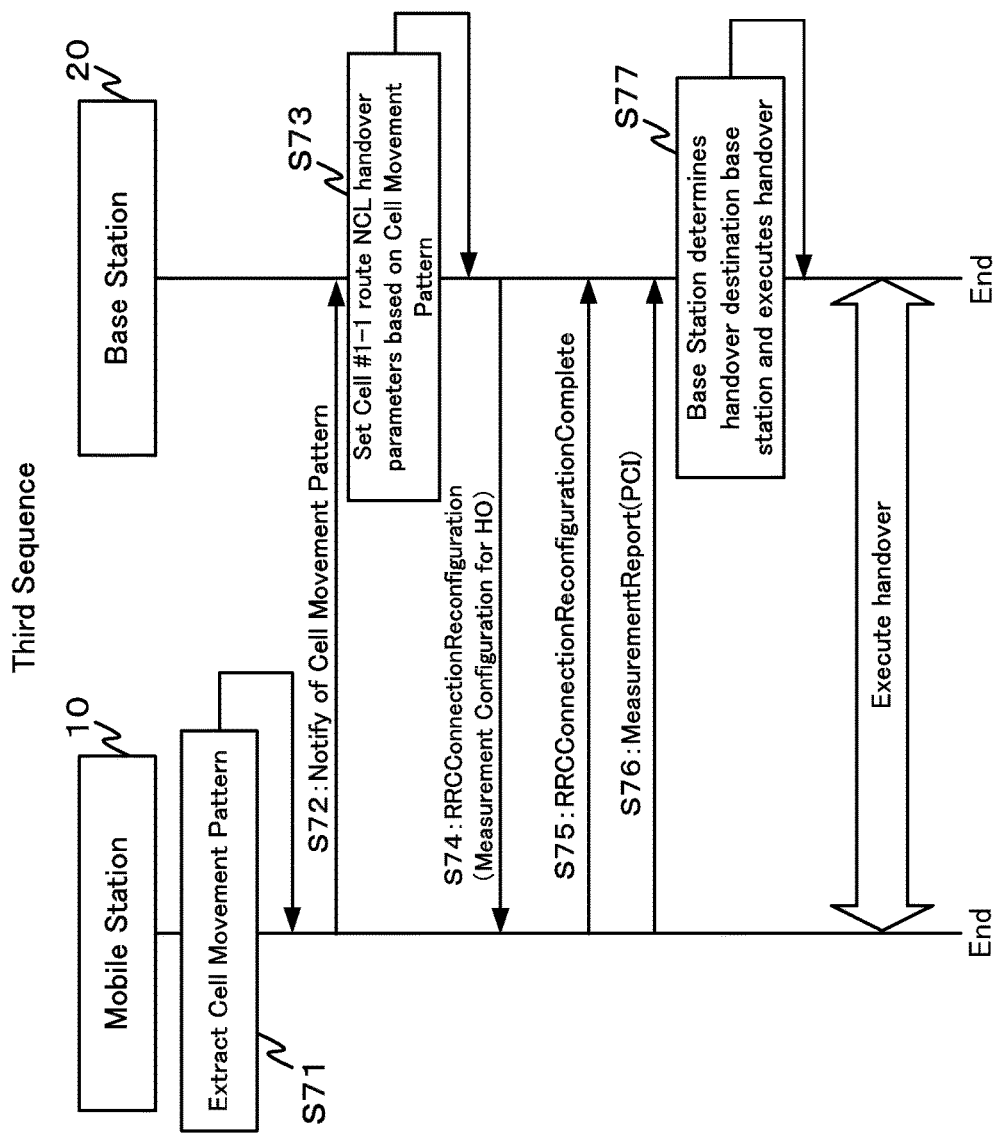
FIG. 10 A sequence diagram shows a third sequence in an embodiment of the present invention.

Next, a third sequence is explained by referring to FIG. 10.

The mobile station 10 extracts a cell movement pattern from the movement history storage 14 (Step S71) and notifies the base station 20 of the cell movement pattern (Step S72).

The base station 20 selects neighbor cell information corresponding to this cell movement pattern. In this example, this is Cell #1-1 route NCL. Then, for executing Measurement Configuration of this Cell #1-1 route NCL, Measurement Configuration Message is transmitted from the base station 20 to the mobile station 10 by use of RRCConnectionReconfiguration Message. At this time, Cell #1-1 route NCL is included as handover parameters in RRCConnectionReconfiguration Message (Step S73, Step S74).

In a case where the mobile station 10 normally receives RRCConnectionReconfiguration Message, the mobile station 10 transmits RRCConnectionReconfiguration Complete to the base station 20 (Step S75). Then, the mobile station 10 begins measurement of peripheral cells. This measurement is executed on the basis of Cell #1-1 route NCL included in Measurement Configuration Message. Namely, measurement for Cell #5, Cell #6 and Cell #7 is executed. The mobile station 10 detects neighbor cells in a condition of RRCConnectionReconfiguration, executes measurement, and transmits Measurement Report to the base station 20 specifying PCI (Physical Cell Identity) (Step S76). The base station 20 executes handover to, for example, a cell whose reception level is large on the basis of MR (Measurement Report).

Figure 11:
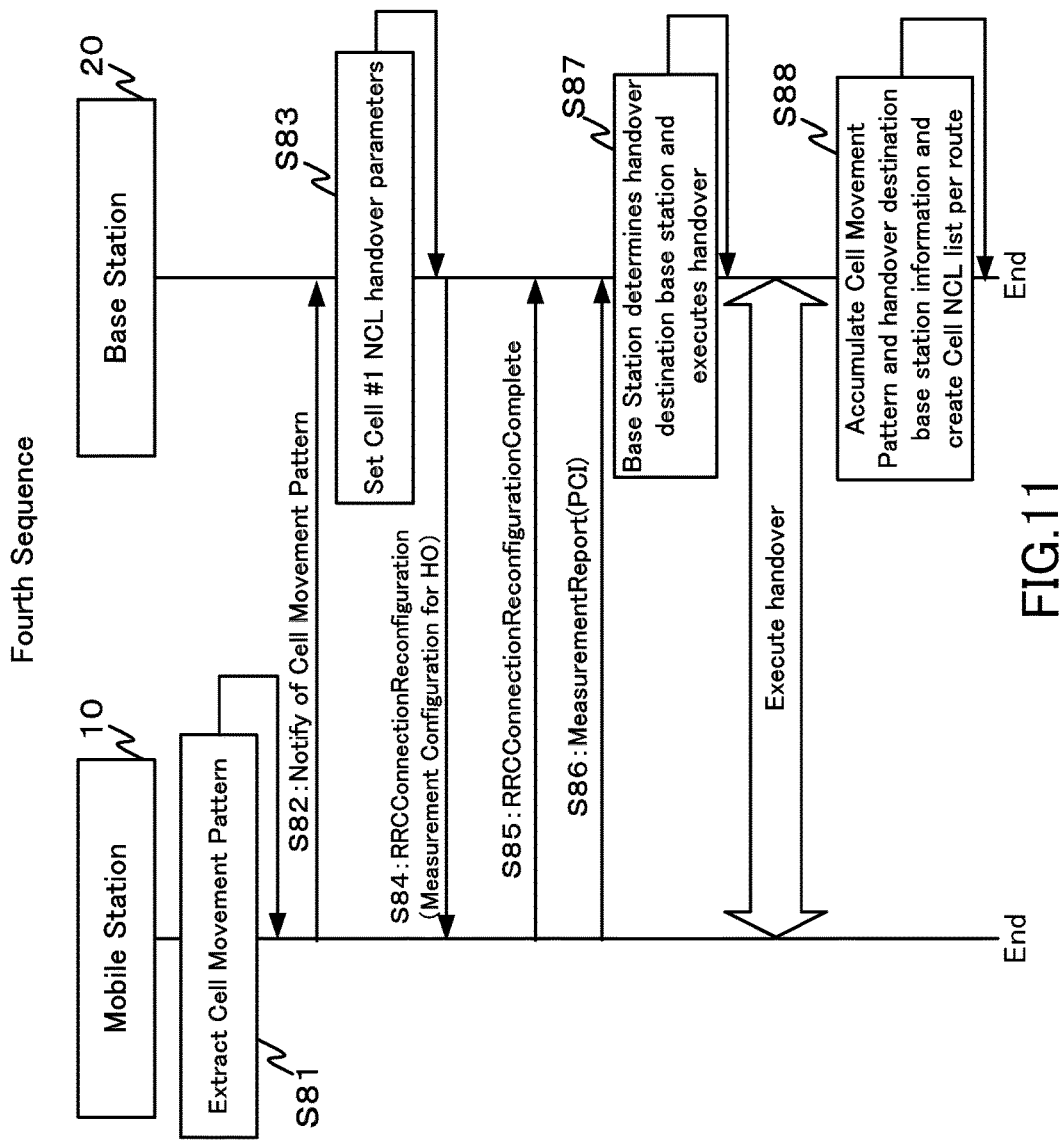
FIG. 11 A sequence diagram shows a fourth sequence in an embodiment of the present invention.

Finally, a fourth sequence is explained by referring to FIG. 11. This sequence is a diagram which shows a creation method of neighbor cell information of this embodiment, namely neighbor cell information per cell movement pattern. This creation of neighbor cell information is performed autonomously by a neighbor cell information transmission system without a user's operation or instruction and is one of SON (Self Organizing Network) functions which is being standardized in the 3GPP (3$^{rd}$ Generation Partnership Project).

The mobile station 10 extracts a cell movement pattern from the movement history storage 14 (Step S81) and notifies the base station 20 of the cell movement pattern (Step S82). The base station 20 selects neighbor cell information corresponding to this notified cell movement pattern (Step S83). In this example, supposed is a case where Cell $1-1 route NCL has not been created yet. Therefore, Cell #1 NCL is selected. Meanwhile, if Cell #1-1 route NCL has already been created, the Cell #1-1 route NCL is selected.

Explanation regarding Step S84 to Step S87 after that is omitted because those steps are similar to Step S74 to Step S77.

Then, after executing handover, the base station 20 accumulates combinations of the cell movement pattern and handover destination cells and generates a below Cell NCL list per route.

Route "Cell #8→Cell #3→Cell #1": HO destination Cell #5 3, Cell #6 10, Cell #7 5;

Route "Cell #9→Cell #7→Cell #1": HO destination Cell #4 2, Cell #5 8, Cell #6 4;

. . . .

Then, on the basis of this Cell NCL list per route, neighbor cell information corresponding to the cell movement pattern is created. For example, with the state that the number of times of being a HO destination is equal to or more than a predetermined number as a condition, a cell which satisfies the condition is added to the neighbor cell information. Specifically, in a case where a process that the cell movement pattern notified in the Step S82 is "Cell #8→Cell #3→Cell #1" and the cell which is treated as the handover destination in the Step S87 is "Cell #5" is executed not less than a predetermined number of times, "Cell #5" is included into the neighbor cell information corresponding to the cell movement pattern "Cell #8→Cell #3→Cell #1". In this way, neighbor cell information corresponding to a cell movement pattern is created.

Meanwhile, above condition may be not "a predetermined number of times" but a state that a percentage of being the HO destination is not less than "a predetermined percentage". For example, it is supposed that a process that the cell movement pattern notified in the Step S82 is "Cell #8→Cell #3→Cell #1" and the cell which is treated as the handover destination in the Step S87 is "Cell #5" is executed repeatedly. Then, in a case where "Cell #5" amounts to not less than 20 percent of all HO destinations regarding the cell movement pattern "Cell #8→Cell #3→Cell #1", "Cell #5" may be included into neighbor cell information corresponding to the cell movement pattern "Cell #8→Cell #3→Cell #1".

Further, in this case, in a case where a percentage of executing handover to a certain cell is less than a predetermined percentage, this certain cell may be deleted from the neighbor cell information. Accordingly, for example, in a case where a peripheral environment changes and "Cell #5" is not selected as a movement destination regarding a cell movement pattern "Cell #8→Cell #3→Cell #1", "Cell #5" is deleted from the neighbor cell information.

The embodiment of the present invention explained above brings many effects as below.

A first effect is that neighbor cell information is notified to the mobile station per a subdivided cell movement pattern of the mobile station's most recent (for example, three cells) locations, and therefore, the waste of neighbor cell search based on the most recent movement history of the mobile station's location is restrained and it is possible to execute neighbor cell search fast at the mobile station.

Further, a second effect is that the neighbor cell information transmission system autonomously accumulates information of a cell selected as the HO destination actually, and therefore, it is possible to create neighbor cell information without a user's operation or instruction.

Furthermore, although above noted embodiment is a preferred embodiment of the present invention, the scope of the present invention is not limited to the above noted embodiment and it is possible to perform various altered forms within a scope being not deviated from the gist of the present invention.

Meanwhile, if this embodiment is executed as a system in conformity with LTE (Long Term Evolution) standard, the execution is possible by altering "TS36.331v9.3.0(2010-06)" of 3GPP standard specification (see NPL 1) as below.

For example, as shown in FIG. 12 and FIG. 13, neighbor cell information is added into SystemInformationBlockType for every areas as SystemInformationBlockType 3.1, SystemInformationBlockType 3.2, . . . .

Similarly, as shown in FIG. 14 and FIG. 15, neighbor cell information is added into SystemInformationBlockType for every areas as SystemInformationBlockType 4.1, SystemInformationBlockType 4.2, . . . .

Meanwhile, above noted neighbor cell information transmission system can be implemented by hardware, software, or combination thereof. Further, the neighbor cell information transmission method performed by above noted neighbor cell information transmission system can be implemented by hardware, software, or combination thereof. Here, the expression "implemented by software" means "implemented by a computer reading and executing a program".

A program may be stored using various types of a non-transitory computer readable medium and may be supplied to the computer. The non-transitory computer readable medium includes various types of a tangible storage medium. Examples of the non-transitory computer readable medium include a magnetic recording medium (e.g., flexible disk, magnetic tape, hard disk drive), a magnet-optical recording medium (e.g., magneto-optical disk), a CD-ROM (Read Only Memory), a CD-R, a CD-R/W, a semiconductor memory (e.g., mask ROM, a PROM (Programmable ROM), an EPROM (Erasable PROM), a flash ROM, and a RAM (random access memory)). Further, the program may be supplied to the computer by various types of a transitory computer readable medium as well. Examples of the transitory computer readable medium include an electric signal, an optical signal, and an electromagnetic wave. The transitory computer readable medium may supply the program to the computer via a wired channel such as an electric cable or an optical fiber, or via a wireless channel.

The present application is based on Japanese Patent Application No. 2013-010210 (filed on Nov. 8, 2013), and claims priority under the Paris convention to Japanese Patent Application No. 2013-010210. The entire contents of Japanese Patent Application No. 2013-010210 are incorporated by reference into this specification.

Although representative embodiments of the present invention have been described, it should be understood that various changes, substitutions, and alternatives may be made without departing from the spirit and scope of the claimed invention. The inventor's intention is that, even if the claims are amended in the course of application procedures, the equivalent scopes of the claimed invention should be maintained.

A part or entirety of the above-described embodiments may be described as in the following supplementary notes, but are not limited thereto.

(Supplementary Note 1)

A base station for executing wireless communication with a mobile station, wherein
according to a content of movement history of the mobile station that has moved into a cell under control of the base station, the base station differentiates a content of a neighbor cell list used by the mobile station.

(Supplementary Note 2)

The base station according to Supplementary note 1, the base station comprising:
a neighbor cell information storage which stores a plurality of pairs, each of the pairs including a combination of cells which the mobile station is supposed to move through until the mobile station moves into the cell under control of the base station, and a neighbor cell list corresponding to the combination; and
a receiver which receives, from the mobile station, a combination of cells which the mobile station has actually moved through until the mobile station moves into the cell under control of the base station, retrieves a neighbor cell list corresponding to the received content, and replies the neighbor cell list to the mobile station.

(Supplementary Note 3)

The base station according to Supplementary note 1, the base station comprising:
a neighbor cell information storage which stores a plurality of pairs, each of the pairs including a combination of cells which the mobile station is supposed to move through until the mobile station moves into the cell under control of the base station, and a neighbor cell list corresponding to the combination; and
a transmitter which transmits the plurality of combinations to the mobile station, wherein
the mobile station retrieves a neighbor cell list corresponding to an actual movement history of the mobile station from the plurality of pairs transmitted from the transmitter of the base station and uses the neighbor cell list.

(Supplementary Note 4)

The base station according to Supplementary note 2 or 3, wherein
the base station accumulates the combination of cells which the mobile station has actually moved through until the mobile station moves into the cell under control of the base station, and a destination cell to which the mobile station executes handover from the cell under control of the base station, which are bound together, and, on the basis of the accumulated information, corrects part or all of the plurality of pairs stored in the neighbor cell information storage or adds a new pair to the neighbor cell information storage.

(Supplementary Note 5)

The base station according to one of Supplementary notes 1 to 4, wherein
a cell where the mobile station existed just before the mobile station moves into the cell under control of the base station is excluded from the neighbor cell list.

(Supplementary Note 6)

The base station according to one of Supplementary notes 1 to 5, wherein
in a case where it can be determined that a user utilizing the mobile station moves into the cell under control of the base station by use of a certain movement path, one or more cells into which it is impossible to move from the cell under control of the base station by use of the certain movement path are excluded from the neighbor cell list.

(Supplementary Note 7)

A mobile station for receiving the plurality of pairs from the base station according to Supplementary note 2, retrieving a neighbor cell list corresponding to an actual movement history of the mobile station itself from the received plurality of pairs and using the neighbor cell list.

(Supplementary Note 8)

A cell information transmission system including a base station and a mobile station, comprising
a neighbor cell information storage which stores a plurality of pairs, each of the pairs including a combination of cells which the mobile station is supposed to move through until the mobile station moves into a cell under control of the base station, and a neighbor cell list corresponding to the combination; and
a retriever which retrieves a neighbor cell list corresponding to an actual movement history of the mobile station from the plurality of pairs stored in the neighbor cell information storage, wherein
the mobile station uses the retrieved neighbor cell list.

(Supplementary Note 9)

A cell information transmission program for causing a computer to function as a base station executing wireless communication with a mobile station, the program causing the computer to function as:
a base station which, according to a content of movement history of the mobile station moving into a cell under control of the base station, differentiates a content of a neighbor cell list transmitted to the mobile station.

(Supplementary Note 10)

A cell information transmission method performed by a system including a base station and a mobile station, comprising:
the base station storing a plurality of pairs into a neighbor cell information storage, each of the pairs including a combination of cells which the mobile station is supposed to move through until the mobile station moves into a cell under control of the base station, and a neighbor cell list corresponding to the combination;
the base station or the mobile station retrieving a neighbor cell list corresponding to an actual movement history of the mobile station from the plurality of pairs stored in the neighbor cell information storage; and
the mobile station using the retrieved neighbor cell list.

(Supplementary Note 11)

A cell information transmission method performed by a base station executing wireless communication with a mobile station, comprising
according to a content of movement history of the mobile station moving into a cell under control of the base station, differentiating a content of a neighbor cell list used by the mobile station.

INDUSTRIAL APPLICABILITY

The present invention is preferable for whole of communication systems which transmit information taking a movement history of a mobile station into consideration.

The invention claimed is:

1. A base station comprising:
   a communication system configured to perform wireless communication with a mobile station;
   one or more processors configured to change a content of a neighbor cell list used by the mobile station when the mobile station has moved into a cell under control of the base station, based on which movement route to the cell is used by the mobile station among a plurality of movement routes to the cell;
   a neighbor cell information storage which stores a plurality of pairs, each of the pairs including a combination of cells which the mobile station is supposed to move through until the mobile station moves into the cell under control of the base station, and a neighbor cell list corresponding to the combination; and
   a receiver which receives, from the mobile station, a combination of cells that the mobile station has moved through actually until the mobile station moves into the cell under control of the base station, which retrieves a neighbor cell list corresponding to the received content, and which replies the neighbor cell list to the mobile station.

2. The base station according to claim 1, wherein the base station accumulates the combination of cells which the mobile station has actually moved through until the mobile station moves into the cell under control of the base station, and a destination cell to which the mobile station executes handover from the cell under control of the base station, which are bound together, and, on the basis of the accumulated information, corrects part or all of the plurality of pairs stored in the neighbor cell information storage or adds a new pair to the neighbor cell information storage.

3. The base station according to claim 1, wherein a cell where the mobile station existed just before the mobile station moves into the cell under control of the base station is excluded from the neighbor cell list.

4. The base station according to claim 1, wherein when it is determined that a user utilizing the mobile station moves into the cell under control of the base station by use of a certain movement path, one or more cells into which it is impossible to move from the cell under control of the base station by use of the certain movement path are excluded from the neighbor cell list.

5. A mobile station for receiving the plurality of pairs from the base station according to claim 1, the mobile station comprising:
   one or more processors configured to retrieve a neighbor cell list corresponding to an actual movement history of the mobile station itself from the received plurality of pairs and using the neighbor cell list.

6. The base station according to claim 2, wherein a cell where the mobile station existed just before the mobile station moves into the cell under control of the base station is excluded from the neighbor cell list.

7. The base station according to claim 2, wherein when it is determined that a user utilizing the mobile station moves into the cell under control of the base station by use of a certain movement path, one or more cells into which it is impossible to move from the cell under control of the base station by use of the certain movement path are excluded from the neighbor cell list.

8. The base station according to claim 3, wherein when it is determined that a user utilizing the mobile station moves into the cell under control of the base station by use of a certain movement path, one or more cells into which it is impossible to move from the cell under control of the base station by use of the certain movement path are excluded from the neighbor cell list.

9. A base station comprising:
   a communication system configured to perform wireless communication with a mobile station;
   one or more processors configured to change a content of a neighbor cell list used by the mobile station when the mobile station has moved into a cell under control of the base station, based on which movement route to the cell is used by the mobile station among a plurality of movement routes to the cell;
   a neighbor cell information storage which stores a plurality of pairs, each of the pairs including a combination of cells which the mobile station is supposed to move through until the mobile station moves into the cell under control of the base station, and a neighbor cell list corresponding to the combination; and
   a transmitter which transmits the plurality of combinations to the mobile station,
   wherein the mobile station retrieves a neighbor cell list corresponding to an actual movement history of the mobile station from the plurality of pairs transmitted from the transmitter of the base station and uses the neighbor cell list.

10. The base station according to claim 9, wherein the base station accumulates the combination of cells which the mobile station has actually moved through until the mobile station moves into the cell under control of the base station, and a destination cell to which the mobile station executes handover from the cell under control of the base station, which are bound together, and, on the basis of the accumulated information, corrects part or all of the plurality of pairs stored in the neighbor cell information storage or adds a new pair to the neighbor cell information storage.

11. The base station according to claim 9, wherein a cell where the mobile station existed just before the mobile station moves into the cell under control of the base station is excluded from the neighbor cell list.

12. The base station according to claim 9, wherein when it is determined that a user utilizing the mobile station moves into the cell under control of the base station by use of a certain movement path, one or more cells into which it is impossible to move from the cell under control of the base station by use of the certain movement path are excluded from the neighbor cell list.

13. The base station according to claim 11, wherein when it is determined that a user utilizing the mobile station moves into the cell under control of the base station by use of a certain movement path, one or more cells into which it is impossible to move from the cell under control of the base station by use of the certain movement path are excluded from the neighbor cell list.

14. A cell information transmission system including a base station and a mobile station, comprising:
   a neighbor cell information storage which stores a plurality of pairs, each of the pairs including a combination of cells which the mobile station is supposed to move through until the mobile station moves into a cell under control of the base station, and a neighbor cell list which is used in the cell and corresponds to the combination; and
   a retriever which retrieves a neighbor cell list corresponding to which movement route to the cell is used by the mobile station among a plurality of movement routes to the cell, from the plurality of pairs stored in the neighbor cell information storage, a content of the neighbor cell list being changed when the mobile station has moved into the cell under control of the base station, wherein the mobile station uses the retrieved neighbor cell list, and the base station includes a communication system configured to perform wireless communication with the mobile station.

15. A cell information transmission method performed by a system including a base station and a mobile station, comprising:

storing, by the base station, a plurality of pairs into a neighbor cell information storage, each of the pairs including a combination of cells which, until the mobile station moves into a cell under control of the base station, the mobile station is supposed to move through, and a neighbor cell list which is used in the cell and corresponds to the combination; and retrieving, by the base station or the mobile station, a neighbor cell list corresponding to which movement route to the cell is used by the mobile station among a plurality of movement routes to the cell, from the plurality of pairs stored in the neighbor cell information storage, a content of the neighbor cell list being changed when the mobile station has moved into the cell under control of the base station;

wherein the mobile station uses the retrieved neighbor cell list, and the base station includes a communication system configured to perform wireless communication with the mobile station.

* * * * *